(12) United States Patent  (10) Patent No.: US 8,485,340 B2
Haehnel  (45) Date of Patent: Jul. 16, 2013

(54) DEVICE FOR TRANSFERRING AND NESTING BLISTER PACKS

(75) Inventor: Bernd Haehnel, Stutensee (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 234 days.

(21) Appl. No.: 13/029,864

(22) Filed: Feb. 17, 2011

(65) Prior Publication Data

US 2011/0226586 A1   Sep. 22, 2011

(30) Foreign Application Priority Data

Mar. 18, 2010 (EP) .................................... 10156917

(51) Int. Cl.
*B65G 57/081* (2006.01)

(52) U.S. Cl.
USPC ...... 198/377.06; 198/375; 198/403; 198/411; 414/791.3

(58) Field of Classification Search
USPC .......... 198/373, 375, 377.01, 377.03, 377.04, 198/377.06, 378, 402, 403, 411; 414/791.3
See application file for complete search history.

(56) References Cited

U.S. PATENT DOCUMENTS

| | | | | |
|---|---|---|---|---|
| 3,823,835 A | * | 7/1974 | Gott et al. | 414/791.3 |
| 3,866,741 A | * | 2/1975 | Carbon et al. | 414/789 |
| 3,948,385 A | * | 4/1976 | Shinomiya | 198/403 |
| 4,124,128 A | * | 11/1978 | Adams et al. | 414/788.3 |
| 4,268,200 A | * | 5/1981 | Fabrig | 414/788.3 |
| 4,299,523 A | * | 11/1981 | Gott et al. | 414/791.3 |
| 4,367,815 A | * | 1/1983 | Fabrig | 198/374 |
| 4,369,015 A | * | 1/1983 | Fabrig | 414/788.3 |
| 4,955,783 A | * | 9/1990 | Grazia | 414/795 |
| 2007/0137982 A1 | * | 6/2007 | Momich | 198/418 |

FOREIGN PATENT DOCUMENTS

| | | |
|---|---|---|
| DE | 2060219 A1 * | 12/1970 |
| DE | 2060219 A1 | 6/1972 |
| DE | 3014896 A1 | 7/1981 |
| DE | 10331875 A1 | 2/2005 |
| WO | WO 9706083 A1 | 2/1997 |

OTHER PUBLICATIONS

European Search Report for EP 10156917 (Sep. 15, 2010).

* cited by examiner

*Primary Examiner* — Patrick Mackey
(74) *Attorney, Agent, or Firm* — Brinks Hofer Gilson & Lione

(57) ABSTRACT

The device for transferring and nesting blister packs comprises a transfer device, which transfers blister packs from a first transport or storage device to a second transport or storage device arranged under the first transport or storage device. The transfer device has a receiving section, which can hold at least two blister packs and which can rotate at least 180°. A first blister pack can be received in the receiving section of the transfer device in a receiving position; the receiving section with the first blister pack can be rotated 180°; and finally a second blister pack can be received in the receiving section in the receiving position and placed onto the first, rotated blister pack.

14 Claims, 12 Drawing Sheets

DEVICE FOR TRANSFERRING AND NESTING BLISTER PACKS

RELATED APPLICATIONS

The present patent document claims the benefit of priority to European Patent Application No. EP 10156917.6, filed Mar. 18, 2010, and entitled "DEVICE FOR TRANSFERRING AND NESTING BLISTER PACKS," the entire contents of each of which are incorporated herein by reference.

FIELD AND BACKGROUND

The invention relates to a device for transferring and nesting blister packs.

Generally, blister packs are stacked facing in the same direction before they are put into boxes on the packaging line. This means that the pockets of the blister packs in the stack are always facing down or always facing up.

By way of exception, however, the two blister packs of a pair can be stacked so that they face in opposite directions, which means that the pockets of one blister pack are always facing those of its neighbor. This makes sense whenever the blister packs have deep pockets and these are arranged on the blister packs so that the two sets of pockets can "mesh" with each other, so to speak. In this way, the stacking height of the blister packs and thus the height of the folding box, into which the stack of blister packs is to be inserted, can be cut nearly in half.

There are many possible ways to stack blister packs in this opposite-facing, nesting manner. Usually, the mechanical designs of such nesting devices are complicated, and the machines are usually extremely large. This leads to high production costs and to a considerable increase in the length of the packaging line

BRIEF SUMMARY

It is an object of the present invention to provide a device for transferring and nesting blister packs together which makes it possible to stack blister packs in opposite-facing directions easily but which occupies only a small amount of space.

At the same time, a method for transferring and nesting blister packs should be provided which can be executed easily in only a small amount of space.

According to an aspect of the invention, the device for transferring and nesting blister packs comprises a first transport or storage device for supplying blister packs and a second transport or storage device for accepting blister packs, wherein the second transport or storage device is arranged underneath the first transport or storage device and encloses an intermediate space with the first transport or storage device. The device also comprises a transfer device for the blister packs, which is arranged in the intermediate space and which serves to accept the blister packs from the first transport or storage device and to hand them off to the second transport or storage device. This transfer device comprises at least one receiving section, which is suitable for receiving at least two blister packs and which can rotate at least 180° around a first axis of rotation.

With this design, blister packs can be easily received, nested with each other in opposite-facing directions, and released, wherein the space requirement remains reduced to a minimum.

In a preferred embodiment, the transfer device comprises a height-adjusting means for adjusting the height of the at least one receiving section, as a result of which the height of the first axis of rotation can be varied. It is thus possible to change between a receiving position, in which each receiving section of the transfer device is as close as possible to the first transport or storage device, and a release position, in which each receiving section of the transfer device is as close as possible to the second transport or storage device. With respect to the rotation of the receiving section, furthermore, both the gap between the receiving section and the first transport or storage device and the gap between the receiving section and the second transport or storage device can be adjusted in such a way that the receiving section can rotate around 180° without colliding with either the first transport or storage device or the second transport or storage device.

The height-adjusting means preferably rotates the at least one receiving section around a second, stationary axis of rotation. Through this combination of the two rotational movements, the height adjustment of the receiving section can be easily correlated with the 180° rotation of the receiving section.

This can be accomplished especially easily by arranging the first axis of rotation and the second axis of rotation so that they are a certain distance away from, and parallel to, each other.

In a first preferred embodiment, the height-adjusting means comprises at least one lever, at one end of which a first shaft is rotatably supported in the area of the first axis of rotation. This shaft is connected to the receiving section and serves to rotate it 180°. In addition, a second shaft, supported rotatably in a stationary housing, is arranged at the other end of the lever in the area of the second axis of rotation; this lever serves to rotate the lever and thus to adjust the height of the first axis of rotation and of the receiving section. With a design of this type, blister packs can be easily nested with each other in oppositely-facing directions, wherein a certain narrow side of the upper blister pack, when in the stacked state, lies above the corresponding narrow side of the lower blister pack.

It is easy to synchronize the first and second rotational movements of the receiving section by using a first drive and a second drive to drive the first shaft and the second shaft by way of toothed belts.

In an alternative embodiment, the height-adjusting means comprises at least one pivot arm, at one end of which a first shaft is rotatably supported in the area of the first axis of rotation, this shaft being connected to a receiving plate, which comprises the at least one receiving section, wherein the first shaft serves to rotate the receiving plate with the at least one receiving section around an angle of 180°. In addition, at the other end of the pivot arm, a second shaft rotatably supported in a stationary housing is arranged in the area of the second axis of rotation to rotate the pivot arm and thus to adjust the height of the first axis of rotation and of the receiving section. With this design, blister packs can be easily nested with each other in opposite-facing directions, wherein a certain narrow side of the upper blister pack comes to lie above the opposite narrow side of the lower blister pack.

As an alternative to rotation around a second axis of rotation, the height-adjusting means for the at least one receiving section can also adjust the height of the receiving section in a linear manner.

In all of the previously described embodiments, it is preferable for each receiving section to comprise at least one upper slide and at least one lower slide, which serve to retain and to release the received blister packs. In this way, the number of components of the receiving section is reduced, and the process of receiving the first blister pack, of rotating the first blister pack 180° in the securely held state, of receiving the second blister pack, and of handing off the two, oppositely-facing, nested blister packs to the second transport or storage device is made possible in a simple manner. The slides can be moved back and forth easily by designing them with pneumatic actuators.

When the blister packs to be nested with each other are also to be laid down horizontally with a certain offset from each other, it is advantageous for the at least one receiving section to be able to move in the horizontal direction by way of a third drive.

A corresponding method for transferring and nesting blister packs in oppositely-facing directions comprises the following steps:

supplying at least one first blister pack by means of a first transport or storage device;

accepting the at least one first blister pack in at least one receiving section of the transfer device in a receiving position;

rotating the at least one receiving section with the at least one first blister pack 180° around a first axis of rotation;

supplying at least one second blister pack by means of the first transport or storage device;

accepting the at least one second blister pack in the at least one receiving section of the transfer device in the receiving position, the at least one second blister pack being laid onto the at least one rotated first blister pack;

releasing the at least one pair of first and second blister packs to a second transport or storage device.

With this method, it is possible to nest blister packs with each other in oppositely-facing directions easily in an extremely small amount of space.

Preferably a plurality of slides can be actuated to hold and to release the blister packs held in the receiving sections. When suitably actuated, the slides can form the individual support surfaces of the receiving section.

The height of each receiving section is preferably shifted between the height of the receiving position, in which it receives the blister packs, and the height of a lower release position, in which it hands the blister packs off. The resulting decrease in the free-fall distance of the blister packs improves the process of receiving and handing off the blister packs.

In a preferred embodiment, the height of each receiving section is shifted within an area between the height of the receiving position and the height of the release position during its 180° rotational movement around the first axis of rotation. In this way, interference with the 180° rotational movement of the receiving section by the first transport or storage device or by the second transport or storage device is prevented, and it is guaranteed that the receiving position can be very close to the first transport or storage device and that the release position can be very close to the second transport or storage device.

BRIEF DESCRIPTION OF THE DRAWINGS

Additional details and advantages of the present invention can be derived from the following description, which makes reference to the drawings.

DETAILED DESCRIPTION OF SPECIFIC EMBODIMENTS

Figure 1:
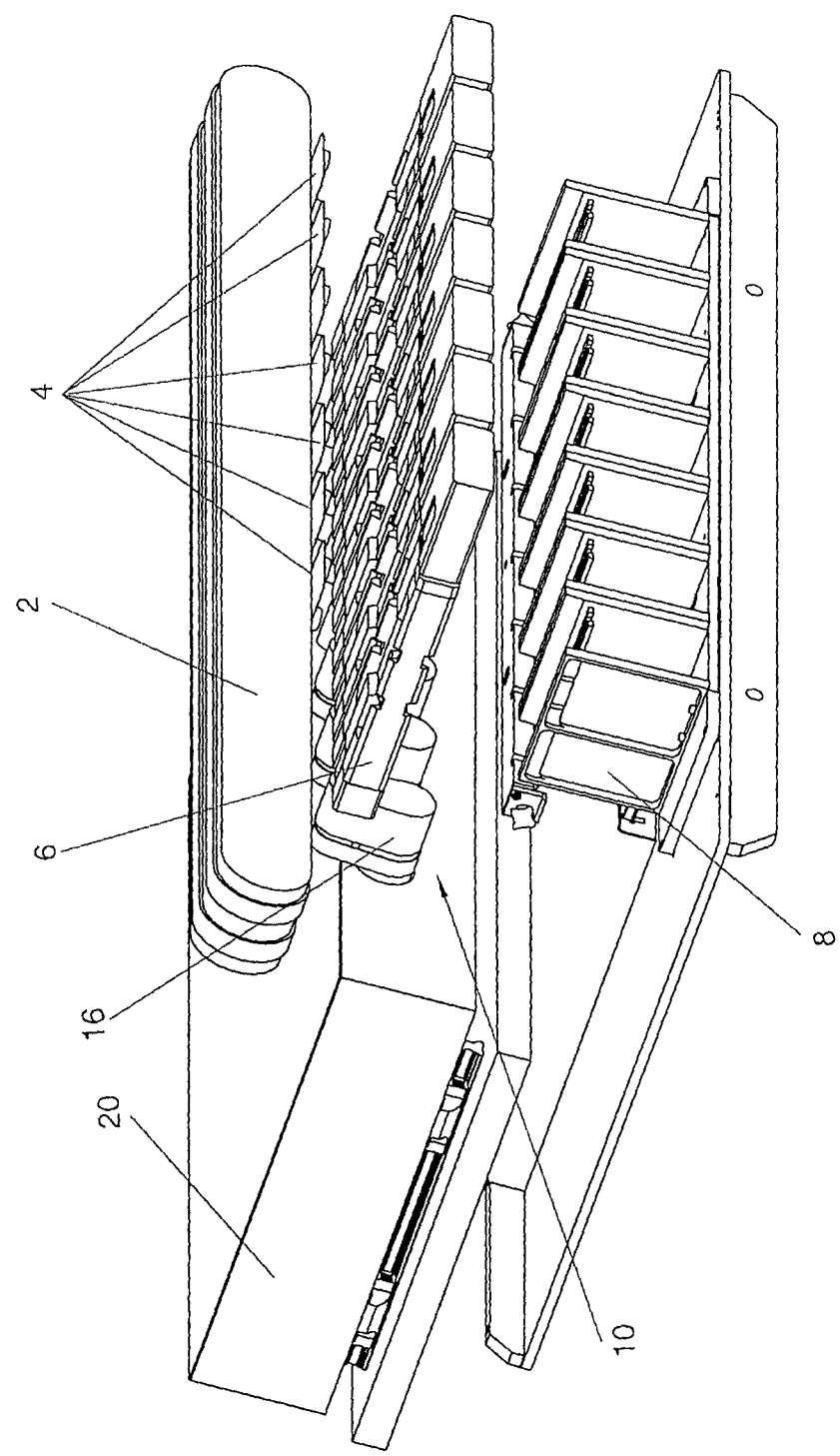
FIG. 1 is a schematic perspective view of a first embodiment of the device for transferring and nesting blister packs.

FIG. 1 shows a first embodiment of the device for transferring and nesting blister packs. The device comprises a first transport or storage device 2, on which the blister packs 4 are transported or supplied. In the exemplary embodiment shown here, the first transport or storage device 2 is designed as a suction belt, on which the blister packs 4 are transported in a row in a suspended manner. The blister packs 4 can be held at a predetermined spacing from each other with the help of stops (not shown) and knocked down from the belt by striking elements (not shown). It is also possible to provide a magazine or an intermediate holding unit as the first transport or storage device 2, which accepts the blister packs 4 and which has bottom flaps (not shown) which open and thus allow blister packs to fall downward.

In the embodiment shown here, the blister packs 4 are supplied by the first transport or storage device 2 in such a way that their pockets are pointing downward. It is also possible to process blister packs 4 which are delivered with the pockets pointing upward.

The blister packs 4 discharged from the first transport or storage device 2 are accepted by the transfer device 6 and handed off to a second transport or storage device 8. In the example shown here, the second transport or storage device 8 is designed as a stacking magazine, in the compartments of which the various blister packs 4 are laid down on top of each other to form stacks. Then the stacks of blister packs 4 can be transferred to the transport unit of the cartoning machine for transporting the goods to be packaged (not shown). It is also possible that the second transport or storage device 8 could be designed as a conveyor belt or as a chain for the goods to be packaged.

In the example shown here, the second transport or storage device 8 is arranged under the first transport or storage device 2 and enclose with it an intermediate space 10, in which the transfer device 6 is located. The transfer device 6 serves not only to transfer the blister packs 4 from the first transport or storage device 2 to the second transport or storage device 8 but also to assemble the blister packs 4 into pairs, each consisting of two blister packs 4, one of which is laid on top of the other so that they are facing in opposite directions, and to release these pairs in the downward direction.

Figure 2:
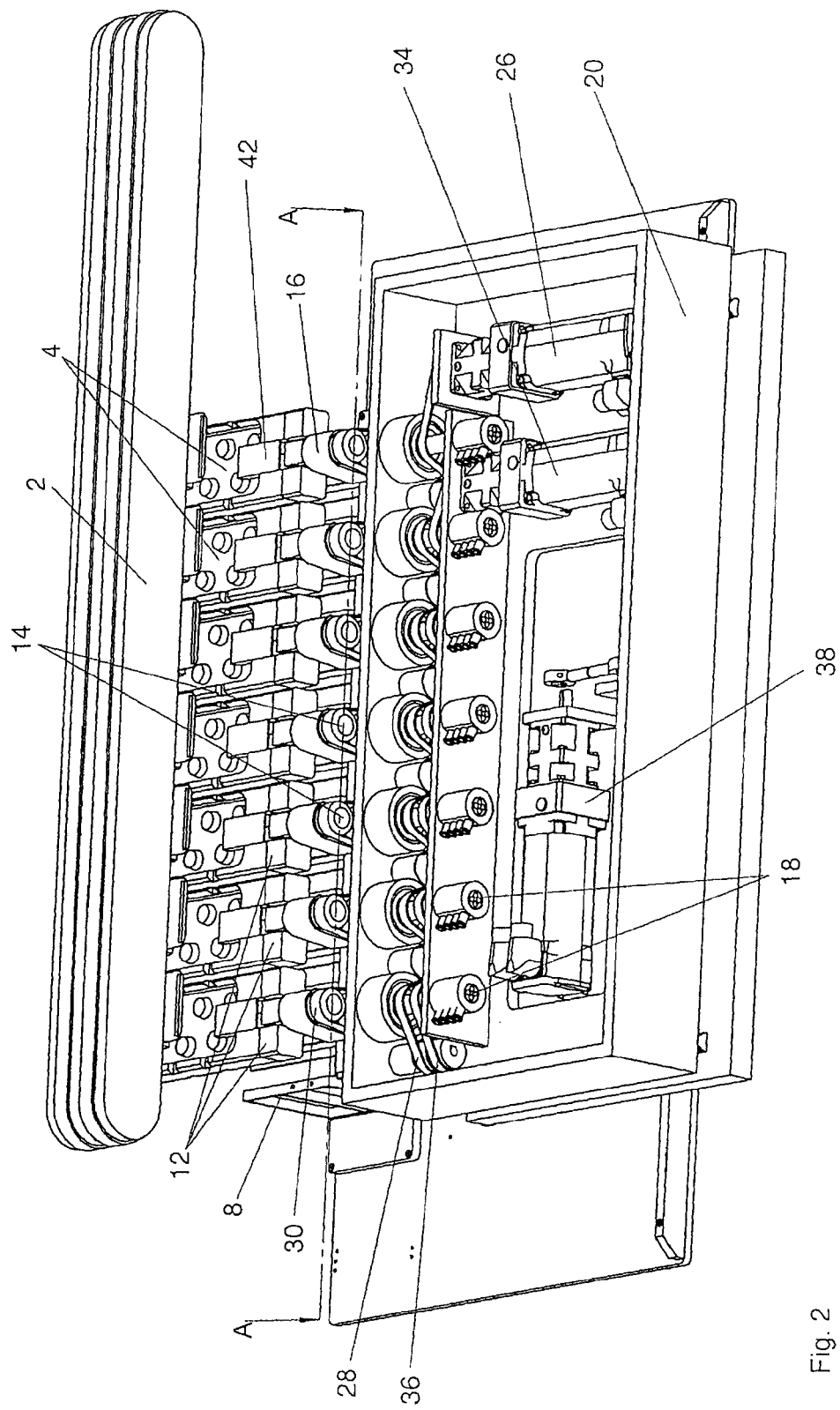
FIG. 2 is a schematic perspective view of the device of FIG. 1 with an opened housing.
Figure 3:
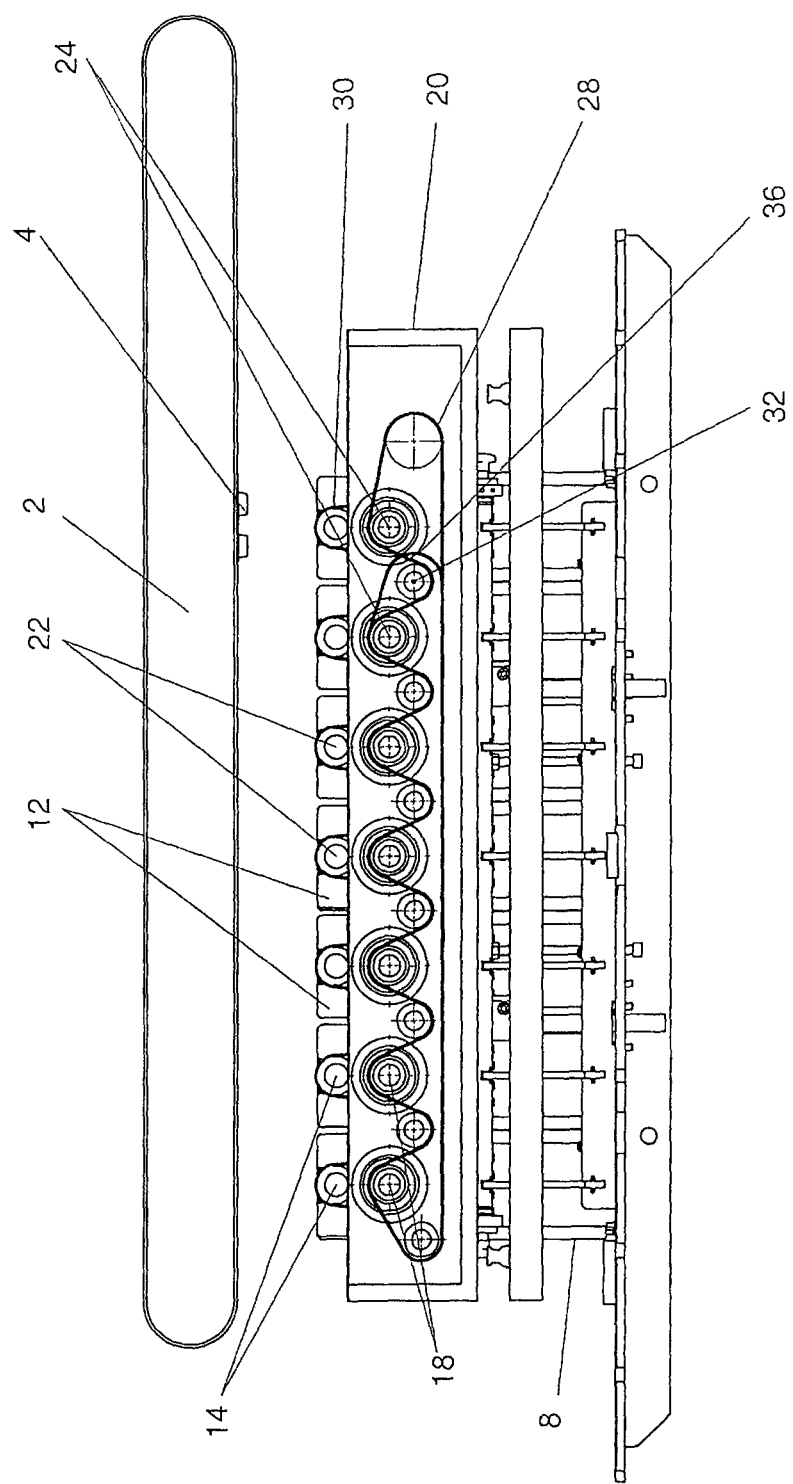
FIG. 3 is a schematic cross section along the line I-I of FIG. 2.

As can be seen in the detailed views of FIGS. 2 and 3, the transfer device 6 has for this purpose several receiving sections 12 arranged in a row to receive the blister packs 4. In the embodiment shown here, each individual receiving section 12 is rotatably supported at one end of the individually assigned lever 16 (see FIG. 1) so that it can be rotated by a first shaft 14. The lever 16 is supported rotatably in turn in a stationary housing 20 by way of a second shaft 18 attached at the other end. Thus a rotation of the first shaft 14 causes the receiving sections 12 to rotate around a first axis of rotation 22, whereas the rotation of the second shaft 18 causes the lever 16 to rotate around a second axis of rotation 24. The first axis of rotation 22 and the second axis of rotation 24 of each individual lever 16 are arranged parallel to, and offset from, each other, preferably one being underneath the other. A rotation of the first shaft 14 around the first axis of rotation 22 thus has the effect of moving the receiving section 12 out of the horizontal position. The receiving section 12 thus rotates around itself, so to speak, and the range of rotation comprises at least 180°. After 180° of rotation, the receiving section 12 has therefore been turned upside-down.

A rotation of the second shaft 18 around the second axis of rotation 24, however, has the effect of tilting the lever 16 sideways and thus also the receiving section 12, as a result of which, in addition to a lateral displacement, there is also a change in the height of the receiving section 12. The lever 16 therefore, in combination with the second shaft 18, forms a means for adjusting the height of the receiving section 12.

The first shafts 14 are driven by a first drive 26, preferably by way of toothed belts 28, 30, in the present case by way of an intermediate additional shaft 32.

The rotation of the second shaft 18 around the second axis of rotation 24, however, is accomplished by means of a second drive 34, preferably also with the help of toothed belts 36. In the embodiment shown here, the rotational movement around the first axis of rotation 22 and the rotational movement around the second axis of rotation 24 are synchronized with each other.

If necessary, an additional, i.e., a third, drive 38 can be provided, which makes it possible for movement to occur in the horizontal direction, transversely to the direction in which the blister packs 4 are traveling in the first transport or storage device 2. This is required when the pairs of blister packs 4 to be received by the receiving section 12 must be nested transversely as a result of the arrangement of the blister pockets.

In the embodiment shown here, the receiving sections 12 are arranged next to each other in a row. The arrangement and number of receiving sections 12, however, can be selected as desired; the number of receiving sections 12 determines the output of the transfer device 6. The receiving sections 12 are preferably exchangeable parts, the design of which depends on the format of the blister packs 4 to be transferred in the specific case.

Figure 4:
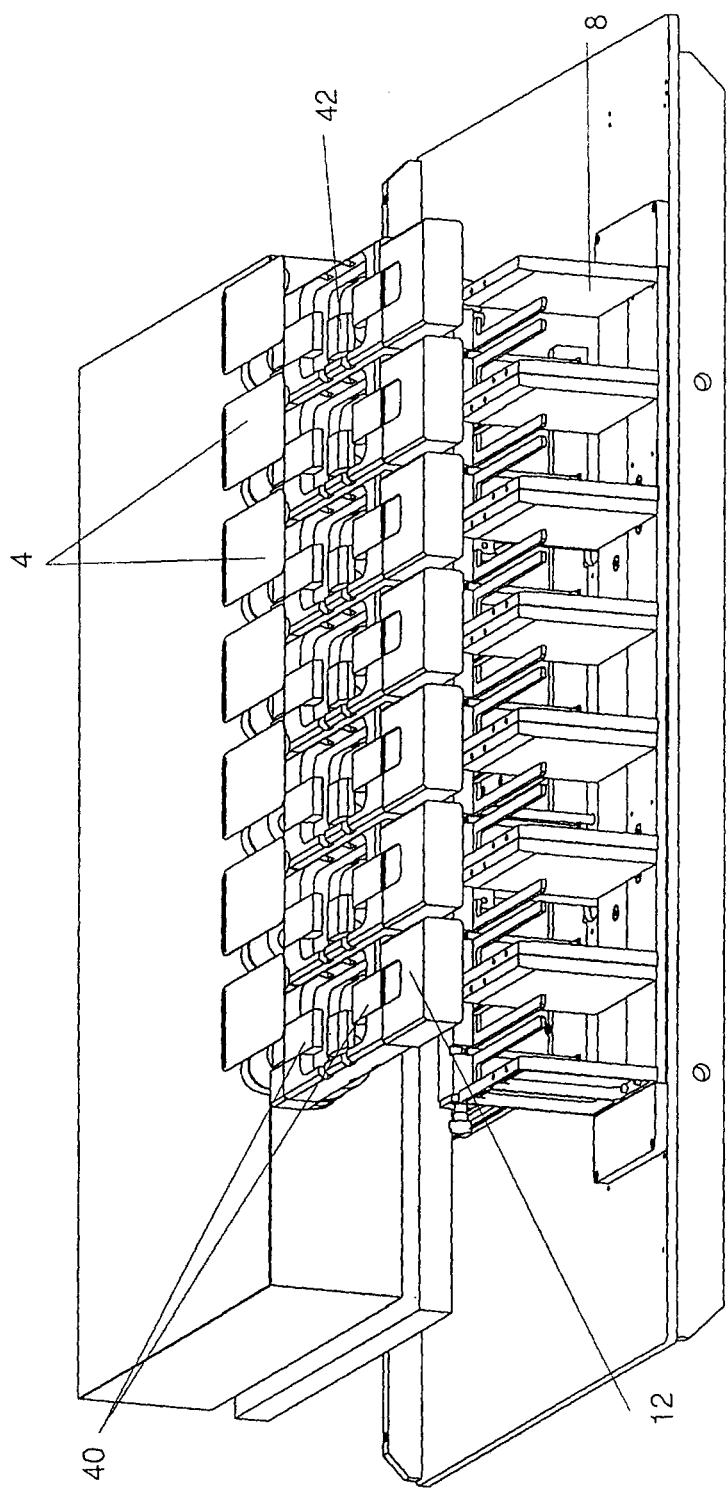
FIG. 4 is a schematic perspective view of the device of FIG. 1 at the beginning of a transfer/release cycle.
Figure 5:
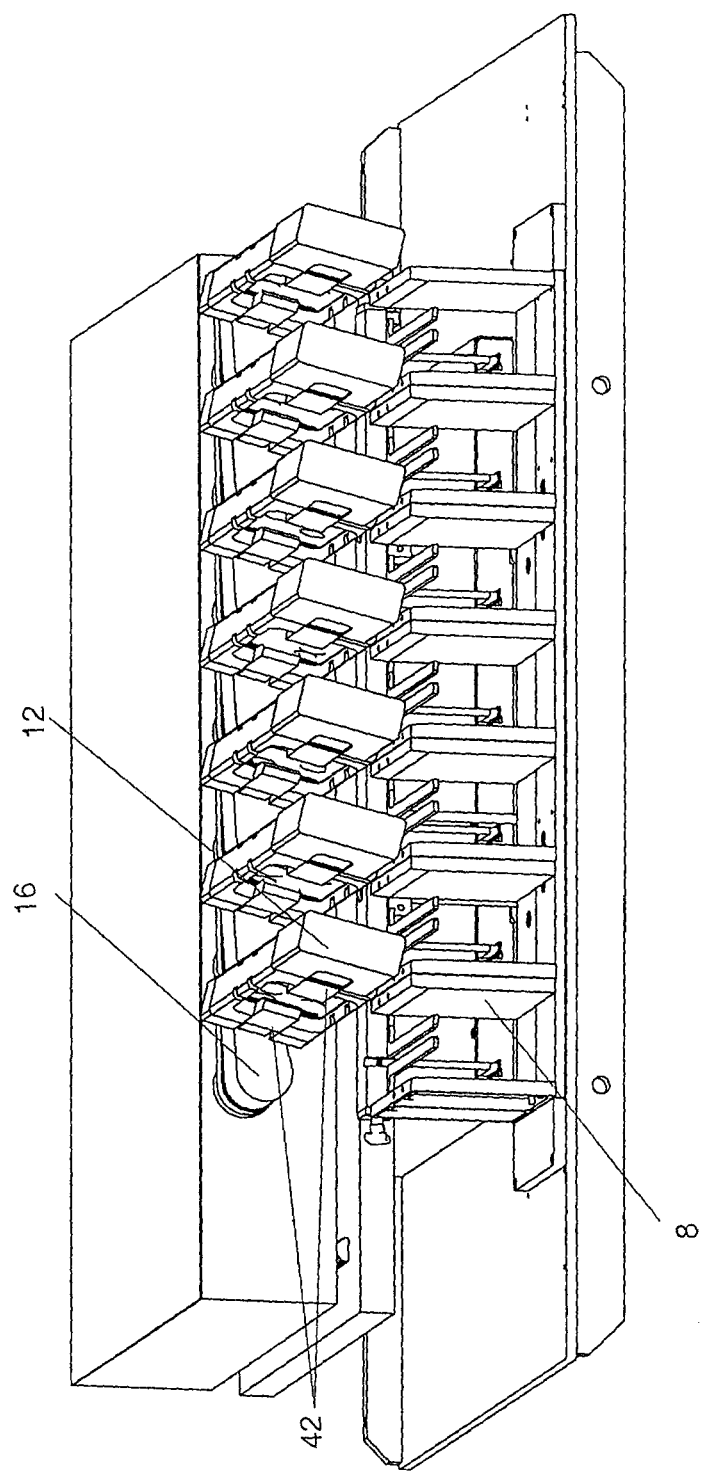
FIG. 5 is a schematic perspective view of the device of FIG. 1 in a first intermediate position of the transfer/release cycle.
Figure 6:
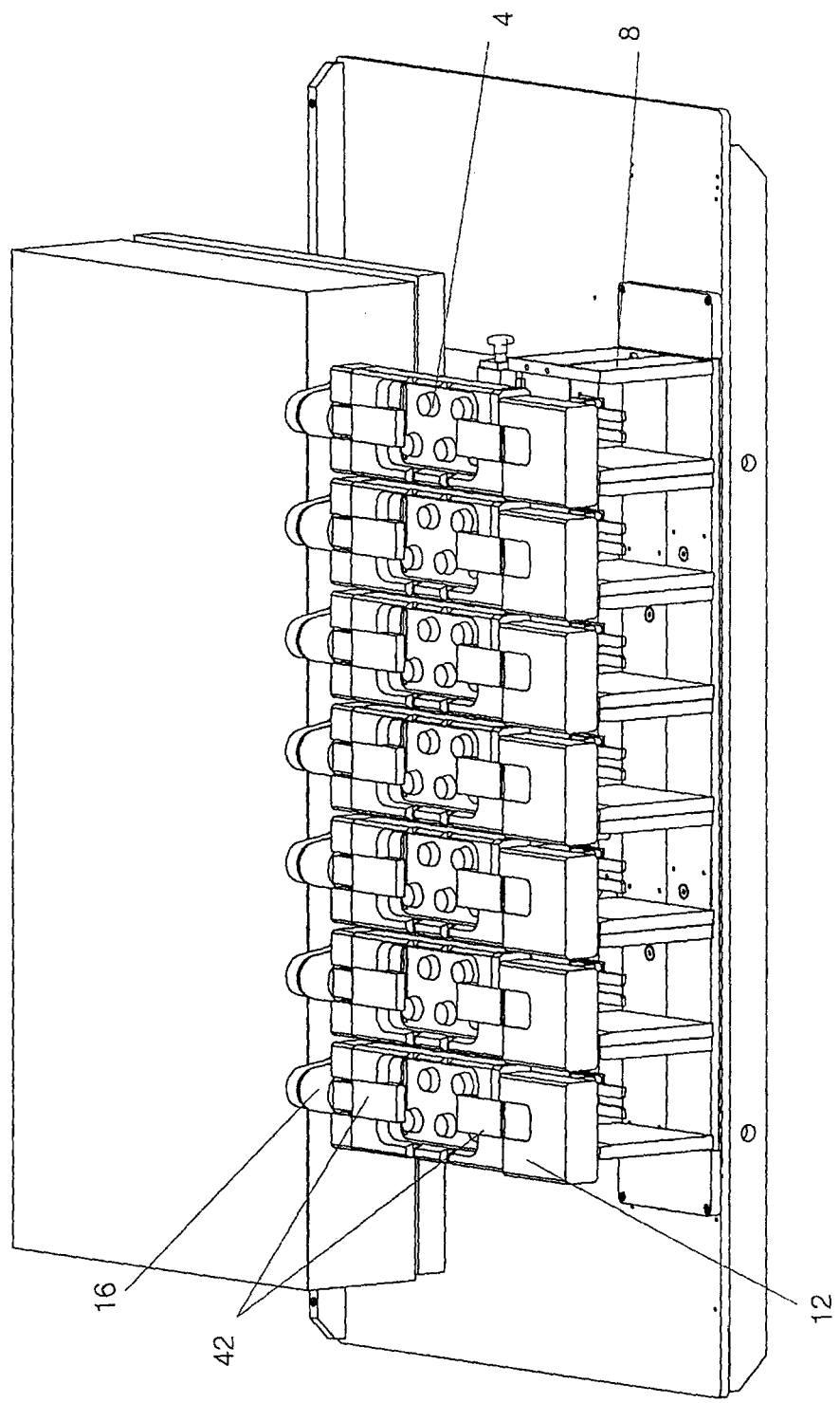
FIG. 6 is a schematic perspective view of the device of FIG. 1 in a second intermediate position of the transfer/release cycle.

Each receiving section 12 comprises at least one upper slide 40 (in the embodiment shown, two oppositely arranged upper slides 40, see FIG. 4) and at least one lower slide 42 (in the embodiment shown, two oppositely arranged lower slides 42), which serve as support surfaces for the blister packs 4 to be transferred. At the same time, the blister packs 4 in the receiving sections 12 are securely retained by the slides 40, 42 and prevented from falling out until they are released again.

The slides 40, 42 are preferably moved separately and opened and closed in correspondence with the associated stage of the transfer/release cycle. The movement can be achieved in a controlled manner by the use of servo motors or preferably by pneumatic means.

FIGS. 4-8 show different stages of the transfer/release cycle for the blister packs 4 in the transfer device 6. For the sake of clarity, the first transport or storage device 2 is omitted.

FIG. 4 shows the beginning of the transfer/release cycle. A number of blister packs 4 have just been brought into position by the first transport or storage device 2. The levers 16 are in a vertical, upward-pointing position, so that the receiving sections 12 are in a receiving position parallel to and underneath the blister packs 4. The lower slides 42 are closed; the upper slides 40 are open. The blister packs 4 are now separated from or released by the first transport or storage device 2 and are received in the associated receiving sections 12. Then the upper slides 40 are closed.

The levers 16 and the receiving sections 12 now execute two coordinated rotational movements, which are managed in such a way that the receiving sections 12 can rotate by 180° around the first axis of rotation 22 without colliding with the first transport or storage device 2 or with the second transport or storage device 8. Simultaneously with the rotation of the receiving sections 12, therefore, the levers 16 are rotated around the second axis of rotation 24, and, with respect to their height, the receiving sections 12 are thus also shifted downward. The upper slides 40 and the lower slides 42 are still closed and thus keep the blister pack 4 in question secured between them.

At the end of the movement shown in FIG. 5, the levers 16 are again in the upward-pointing vertical position, and the receiving sections are again in the associated receiving position directly below the first transport or storage device 2. The blister packs 4 received by the receiving sections 12 have in the meantime been rotated 180°, so that their pockets are now pointing upward. The lower slides 42, which are now on top as a result of the 180° rotation, are opened, so that a second row of blister packs 4 can be accepted by the receiving sections 12.

Figure 7:
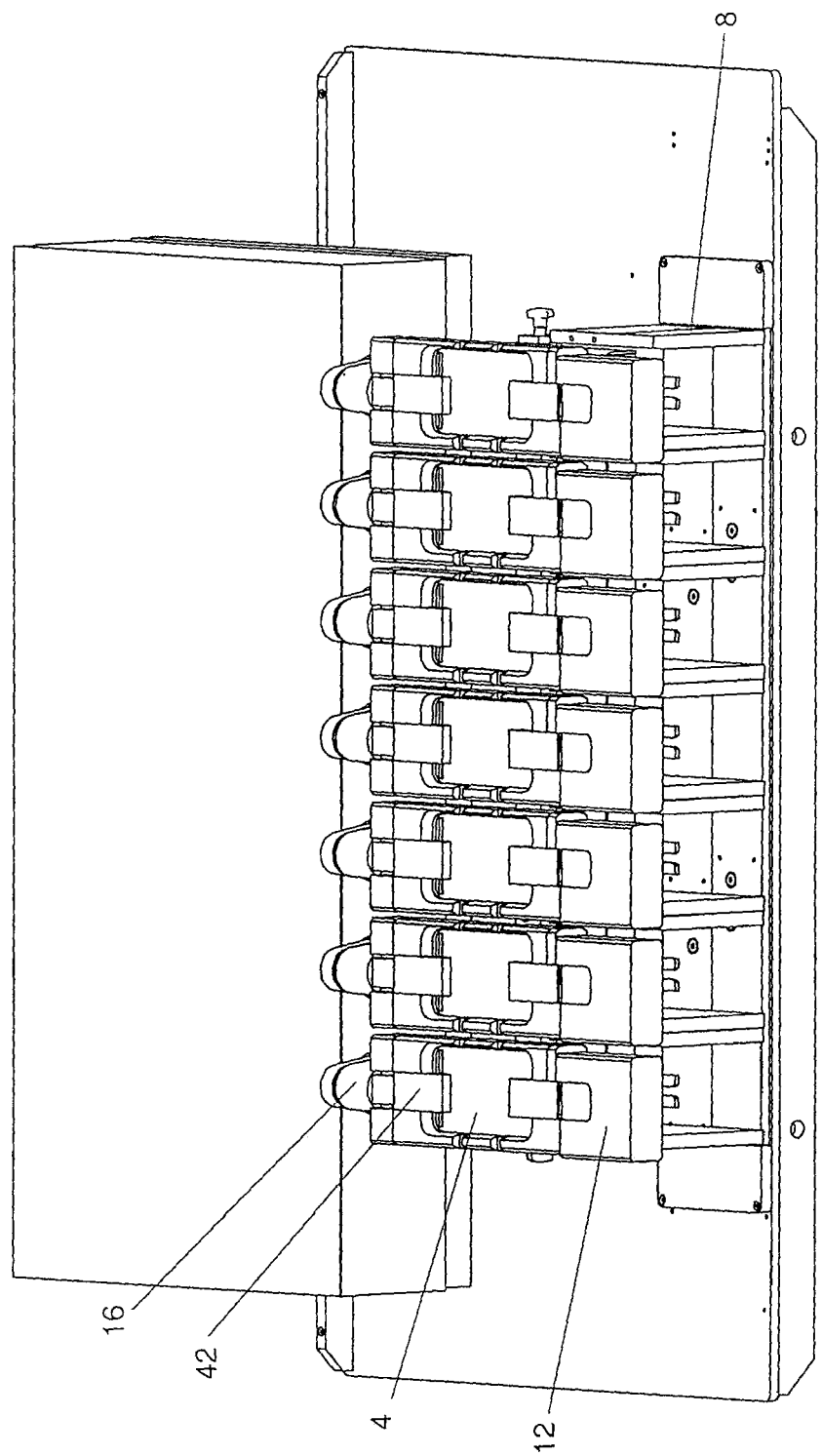
FIG. 7 is a schematic perspective view of the device of FIG. 1 in a third intermediate position of the transfer/release cycle.

In FIG. 7, a complete pair of blister packs 4 has been received by the receiving sections 12. The lower slides 42, which are still on top, have closed again.

Figure 8:
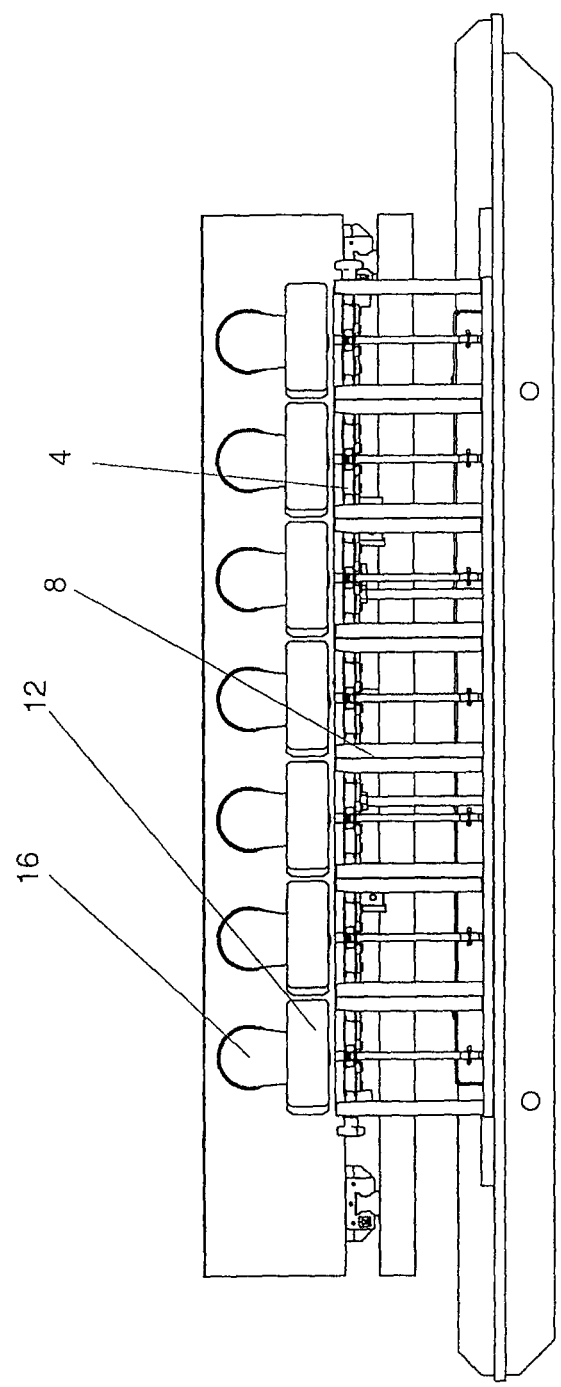
FIG. 8 is a schematic side view of the device of FIG. 1 in an end position of the transfer/release cycle.

In FIG. 8, the levers 16 have moved 180° in the direction toward the second transport or storage device 8. The receiving sections 12 with the pair of blister packs 4, which are stacked in opposite directions, that is, so that their blister pockets are facing each other, are positioned above and parallel to the second transport or storage device 8. The lower slides 42 have been opened, and thus the pairs of blister packs 4 have been released to the second transport or storage device 8. The release position of the receiving sections 12 shown here is located as close as possible to the second transport or storage device 8.

After that, the levers 16 move back into the upper vertical positions, and the receiving sections 12 are again in their receiving position parallel to and under the first transport or storage device 2.

This transfer/release cycle can be repeated until the height of the stack in the second transport or storage device 8 has reached the desired height.

FIGS. 9(a)-9(d) show the variants of the opposite-facing nesting of blister packs which can be realized with the transfer device 6 described above. Common to all the variants is that the same narrow side 44 of the blister packs is always located at the same end.

Figure 9:
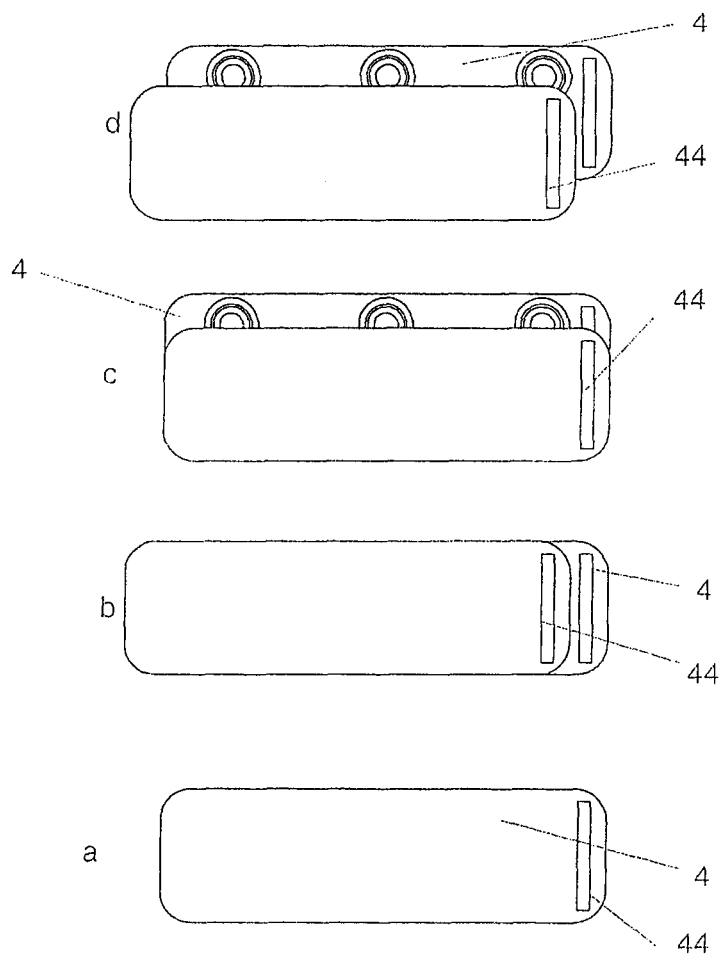
FIGS. 9(a)-9(d) are top views of pairs of blister packs, which have been nested in oppositely-facing directions on each other by means of the device of FIGS. 1-8.

In FIG. 9(a), one of the two blister packs 4 of the pair is lying perfectly on top of the other. This is achieved by arranging the first axis of rotation 22 of the receiving sections 12 symmetrically in a central position of the receiving section.

In FIG. 9(b), one of two blister packs 4 of the pair has been offset in the longitudinal direction from the other. This is achieved by offsetting two ends of the receiving sections 12 in a corresponding manner. So that the blister packs 4 arriving on the first transport or storage device 2 without an offset can be received properly, the entire transfer device 6 is shifted by the third drive 38 after the first blister pack 4 has been received in the receiving section 12.

In FIG. 9(c), one of the two blister packs 4 of the pair has been offset in the travel direction of the suction belt from the other. This is done by again forming the receiving sections 12 in correspondence with the offset. In addition, the first axis of rotation 22 of the receiving sections 12 is offset asymmetrically. To compensate for the asymmetric rotation of the receiving sections 12, the levers 16 do not remain at top dead center while the receiving sections 12 are receiving the blister packs 4; on the contrary, they remain at a certain suitable angle before or after top dead center.

The variant shown in FIG. 9(d) is a combination of the variants according to FIGS. 9(b) and 9(c).

Figure 10:
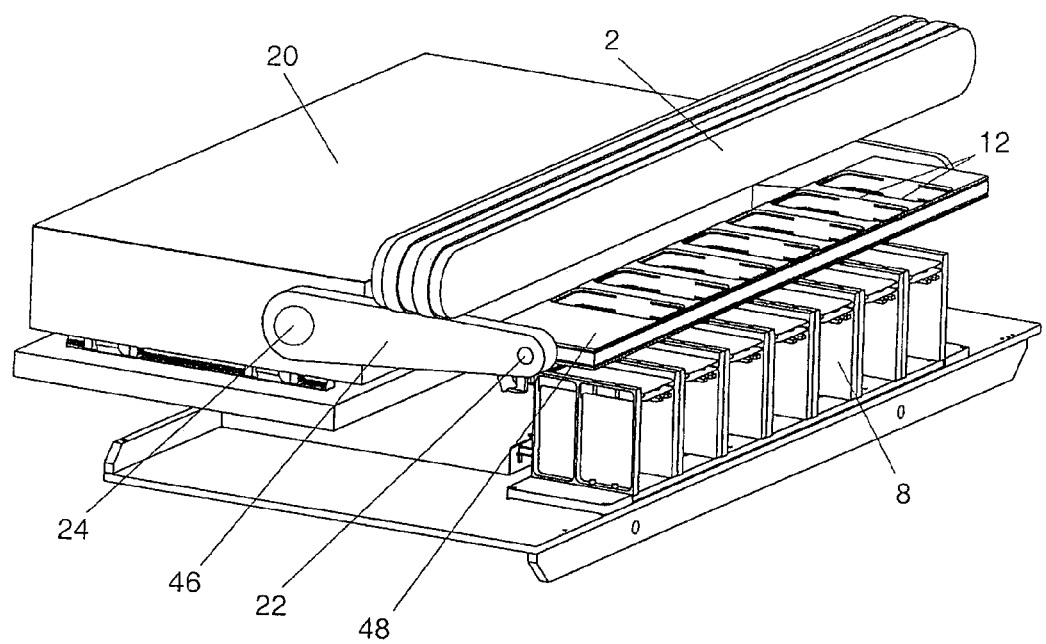
FIG. 10 is a schematic perspective view of a second embodiment of the device for transferring and nesting blister packs.
Figure 11:
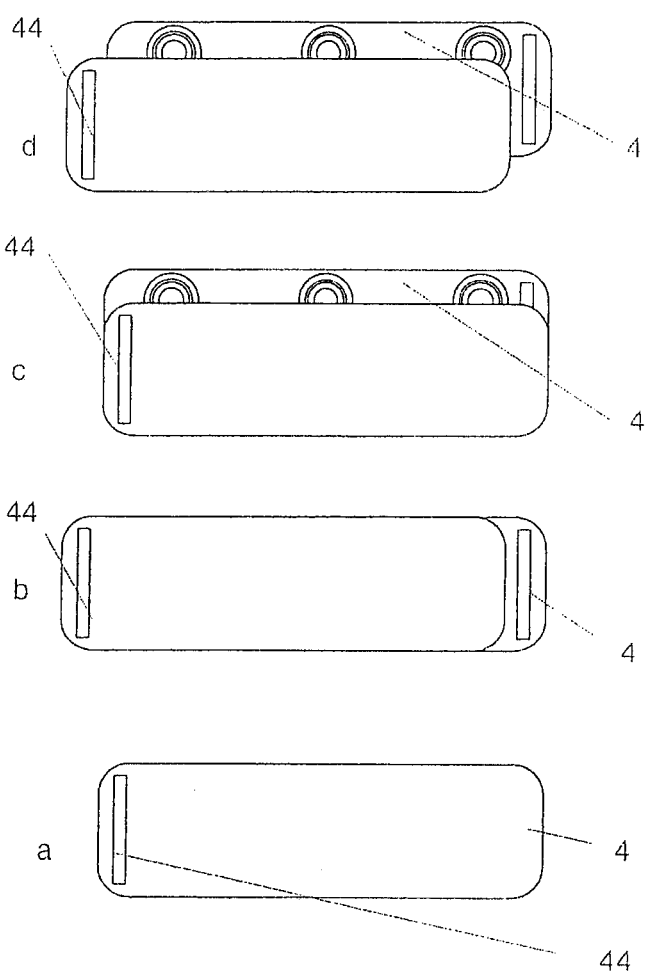
FIG. 11 is a top view of pairs of blister packs, which have been nested on each other in oppositely facing directions by the device of FIG. 10.

In the second embodiment of the device for transferring and nesting blister packs shown in FIG. 10, the means for adjusting the height of the receiving sections 12 is designed in a different way. Here the pivot arm 46 takes over the function of the levers 16 of the previously described embodiment. In contrast to the previously cited embodiment, the receiving sections 12 are not designed as separate elements but instead are formed as integral parts of a receiving plate 48 which is rotated around the first axis of rotation 22 located at one end of the pivot arm 46. The pivot arm 46 in turn pivots around the second, stationary axis of rotation 24 located at the other end.

The sequence of steps is similar to that previously described, except that the 180° rotation of the receiving sections 12 takes place around their other center axis, as a result of which the two stacked blister packs 4 are arranged in a different way.

FIGS. 11(a)-11(d) show the possible ways in which the individual pairs of blister packs 4 can be combined when this transfer device 6 is used.

These combinations are obtained from essentially the same sequences of steps as those shown in FIGS. 9(a)-9(d). The only difference is that the same narrow sides 44 of the stacked blister packs 4 are not arranged one above the other as in FIGS. 9(a)-9(d) but are rather arranged opposite each other.

Figure 12:
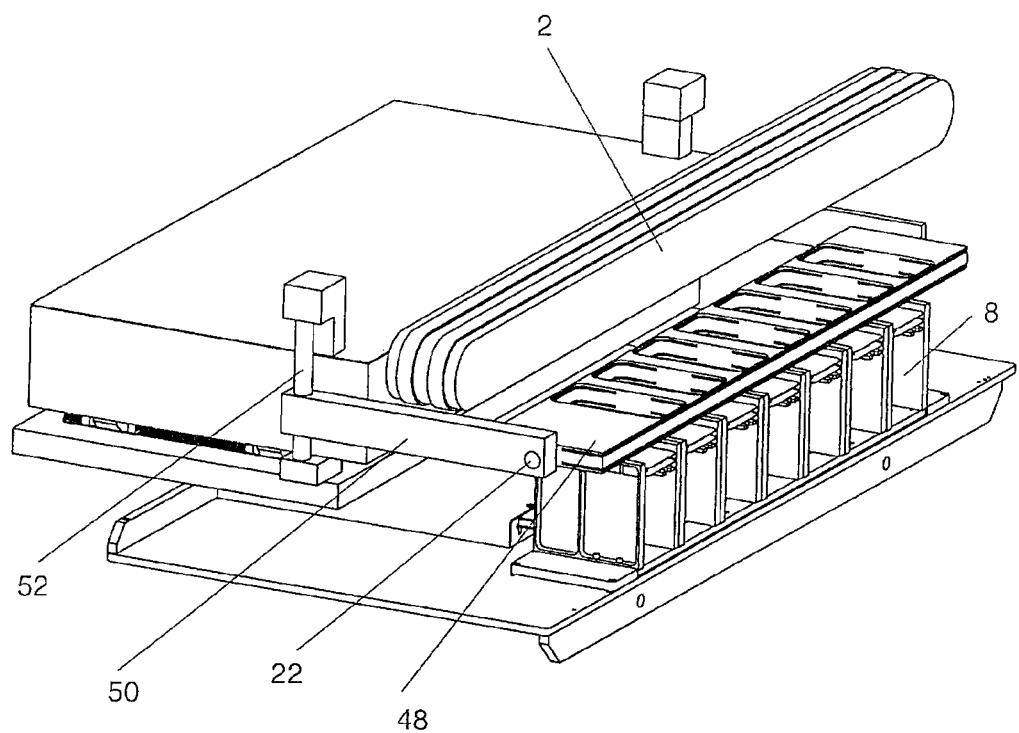
FIG. 12 is a schematic perspective view of a third embodiment of the device for transferring and nesting blister packs.

FIG. 12, finally, shows a third embodiment of the device for transferring and nesting blister packs. In this embodiment, the height-adjusting means consists of a linear shift mechanism 50, 52. Instead of the lever 16 or the pivot arm 46, there is a nonrotating arm 50, which can be moved up and down on a spindle 52, for example.

In addition to the three possibilities shown here, there are many other possible embodiments for the design of the height-adjusting means, which will be readily apparent to the person skilled in the art.

The invention claimed is:

1. A device for transferring and nesting blister packs comprising:
   a first transport or storage device for supplying the blister packs;
   a second transport or storage device for accepting the blister packs, wherein the second transport or storage device is arranged under the first transport or storage device, the first and second transport or storage devices enclosing an intermediate space,
   a transfer device for the blister packs arranged in the intermediate space, the transfer device serving to accept the blister packs from the first transport or storage device and to transfer the blister packs to the second transport or storage device, the transfer device comprising at least one receiving section, which is adapted to hold at least two blister packs and which is rotatable at least 180° around a first axis of rotation; wherein the transfer device comprises height-adjusting means for adjusting the height of the at least one receiving section, the height of the first axis of rotation thus being variable.

2. The device according to claim 1, wherein the at least one receiving section is rotatable by the height-adjusting means around a second, stationary axis of rotation.

3. The device according to claim 2, wherein the first axis of rotation and the second axis of rotation are arranged a certain distance from, and parallel to, each other.

4. The device according to claim 3, wherein the height-adjusting means comprises at least one lever, at a first end of which a first shaft is rotatably supported in an area of the first axis of rotation, the first shaft being connected to the receiving section and serving to rotate the receiving section 180°, and at a second end of which a second shaft, which is rotatably supported in a stationary housing and which serves to rotate the lever and thus to adjust the height of the first axis of rotation and of the at least one receiving section, is arranged in an area of the second axis of rotation.

5. The device according to claim 4, wherein the first shaft and the second shaft are driven by a first drive and a second drive acting by way of toothed belts.

6. The device according to claim 3, wherein the height-adjusting means comprises at least one pivot arm, at a first end of which a first shaft is rotatably supported in an area of the first axis of rotation, the first shaft being connected to a receiving plate, which comprises the at least one receiving section, wherein the first shaft serves to rotate the receiving plate with the at least one receiving section by 180°, and at a second end of which a second shaft, which is rotatably supported in a stationary housing and serves to rotate the pivot arm and thus to adjust the height of the first axis of rotation and of the at least one receiving section, is arranged in an area of the second axis of rotation.

7. The device according to claim 1, wherein the height of the at least one receiving section is adjustable in linear fashion by the height-adjusting means.

8. The device according to claim 1, wherein the at least one receiving section comprises at least one upper slide and at least one lower slide, which serve to retain securely the received blister packs and to release the blister packs again.

9. The device according to claim 8, wherein the slides are moved pneumatically.

10. The device according to claim 1, wherein the at least one receiving section is shiftable in a horizontal direction by a third drive.

11. A method for transferring and nesting blister packs, comprising:
   supplying at least one first blister pack by means of a first transport or storage device;
   accepting the at least one first blister pack in at least one receiving section of the transfer device in a receiving position;
   rotating the at least one receiving section with the at least one first blister pack 180° around a first axis of rotation;
   supplying at least one second blister pack by means of the first transport or storage device;
   accepting the at least one second blister pack in the at least one receiving section of the transfer device in the receiving position, the at least one second blister pack being laid onto the at least one rotated first blister pack;

releasing the at least one pair of first and second blister packs to a second transport or storage device.

12. The method according to claim 11, wherein a plurality of slides is actuated to retain the at least one first and second blister packs securely in the receiving section and to release the at least one pair of first and second blister packs.

13. The method according to claim 11, wherein the height of the at least one receiving section is shifted between a height of the receiving position for receiving the blister packs and a height of a lower release position for releasing the blister packs.

14. The method according to claim 13, wherein the height of the at least one receiving section is shifted to a position having a height of between a height of the receiving position and a height of the release position during its 180° rotational movement around the first axis of rotation.

* * * * *